Jan. 23, 1923.
A. R. ANGUS.
RAILWAY SAFE RUNNING DEVICE.
FILED OCT. 1, 1913.
1,443,304
9 SHEETS-SHEET 1
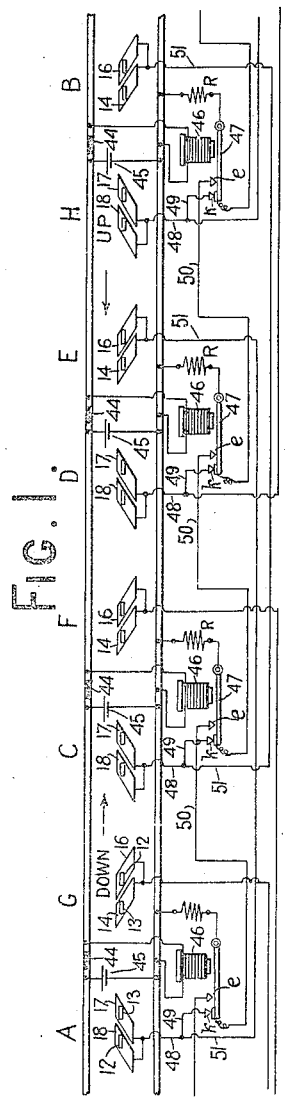
WITNESSES
INVENTOR
A. R. ANGUS.
By
ATTY'S.

Jan. 23, 1923.    1,443,304
A. R. ANGUS.
RAILWAY SAFE RUNNING DEVICE.
FILED OCT. 1, 1913.
9 SHEETS-SHEET 2
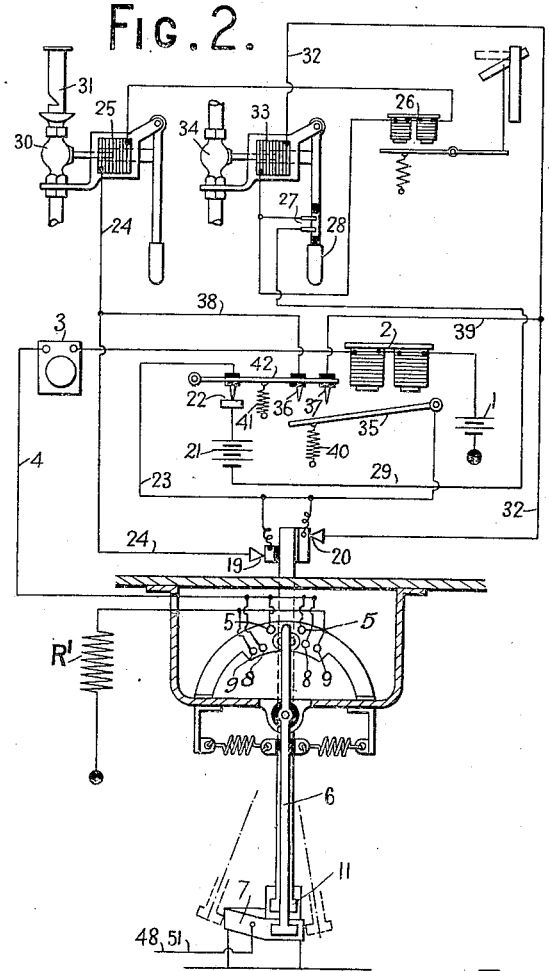

Jan. 23, 1923. 1,443,304
A. R. ANGUS.
RAILWAY SAFE RUNNING DEVICE.
FILED OCT. 1, 1913. 9 SHEETS-SHEET 3
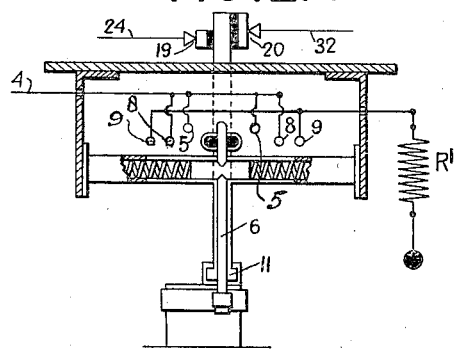
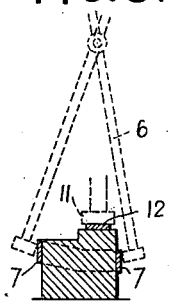
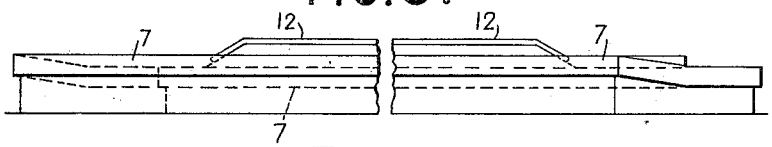
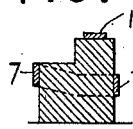
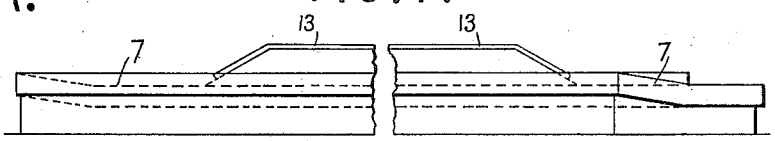
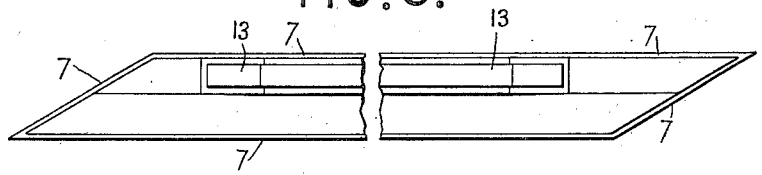
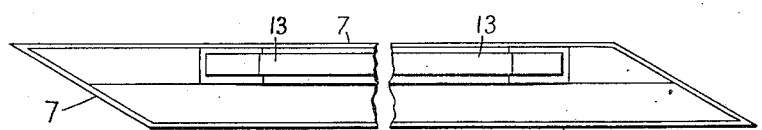
WITNESSES
INVENTOR
A. R. ANGUS
BY
ATTY'S.

Jan. 23, 1923.

A. R. ANGUS.
RAILWAY SAFE RUNNING DEVICE.
FILED OCT. 1, 1913.

WITNESSES

INVENTOR
A. R. ANGUS.
BY Fetherstonhaugh & mart
ATTY'S.

Jan. 23, 1923.　　　　　　　　　　　　　　　　　　　　1,443,304
A. R. ANGUS.
RAILWAY SAFE RUNNING DEVICE.
FILED OCT. 1, 1913.　　　　　　　　　　9 SHEETS-SHEET 5

WITNESSES　　　　　　　　　　　　　　　INVENTOR
　　　　　　　　　　　　　　　　　　　　A. R. ANGUS.
　　　　　　　　　　　　　　BY
　　　　　　　　　　　　　　　　　　　ATT.Y'S.

Jan. 23, 1923. 1,443,304
A. R. ANGUS.
RAILWAY SAFE RUNNING DEVICE.
FILED OCT. 1, 1913. 9 SHEETS-SHEET 6
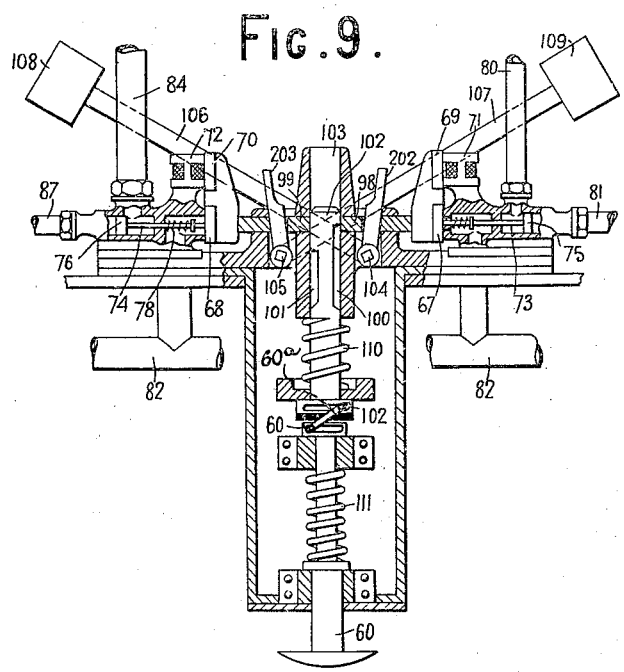
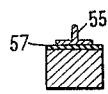
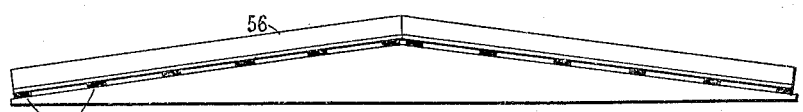
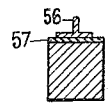
WITNESSES
INVENTOR
A. R. Angus
By Johnston Laugh & Smart
Atty's.

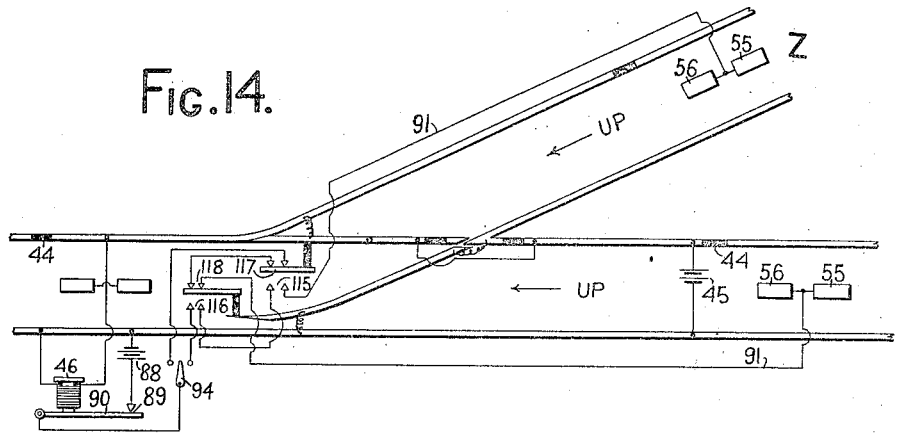
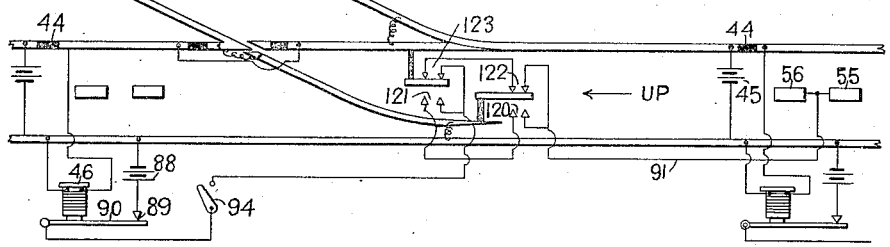
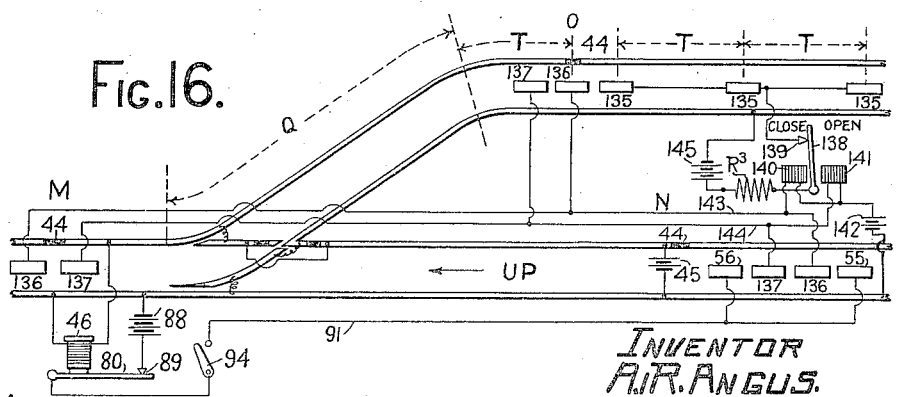

Jan. 23, 1923.
A. R. ANGUS.
RAILWAY SAFE RUNNING DEVICE.
FILED OCT. 1, 1913.

WITNESSES

INVENTOR
A.R. ANGUS.
BY
ATTY'S.

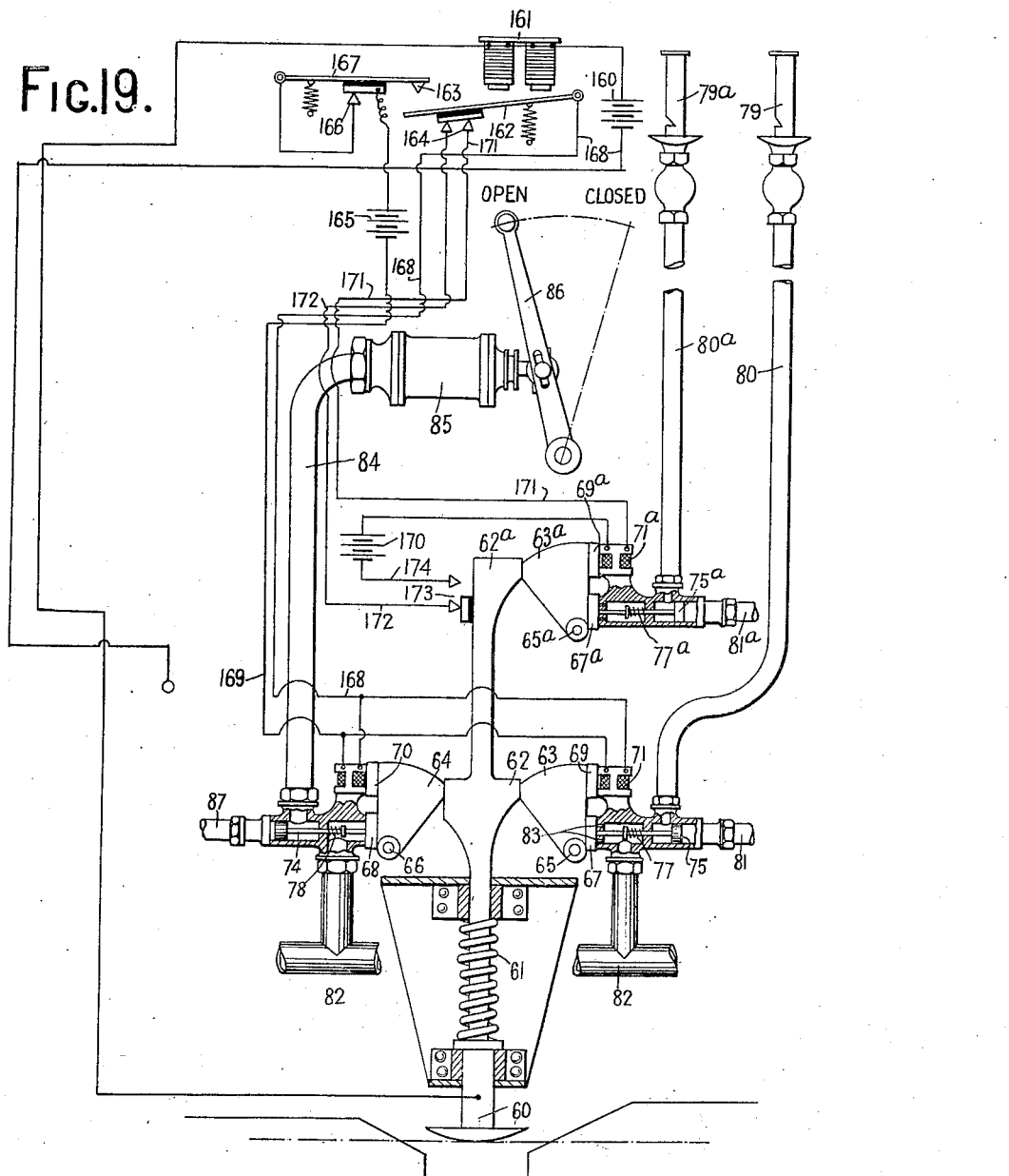

Patented Jan. 23, 1923.

1,443,304

UNITED STATES PATENT OFFICE.

ARTHUR REGINALD ANGUS, OF MINEHEAD, ENGLAND.

RAILWAY SAFE-RUNNING DEVICE.

Application filed October 1, 1913. Serial No. 792,705.

(GRANTED UNDER THE PROVISIONS OF THE ACT OF MARCH 3, 1921, 41 STAT. L., 1313.)

*To all whom it may concern:*

Be it known that I, ARTHUR REGINALD ANGUS, a subject of the King of Great Britain, and a resident of Glenmore House, Glenmore Road, Minehead, in the county of Somerset, England, solicitor, have invented a certain new and useful invention entitled Improvements in or Relating to Railway Safe-Running Devices, of which the following is a specification.

This invention relates to train controlling apparatus and comprises the various features defined in the claims appended hereto.

The invention is illustrated by the accompanying drawings which represent by way of example apparatus constructed and arranged in accordance therewith.

Figs. 1 to 6 inclusive show apparatus suitable for a single line where trains run in both directions.

Figs. 7 to 13 inclusive show apparatus suitable for use on a double line where trains run usually in the same direction on the same track.

Fig. 1 shows a stretch of single track adapted according to these improvements for trains running in both directions.

Fig. 2 is a representation of one example of train apparatus which may be used in connection with apparatus according to this invention as shown in Fig. 1.

Fig. 2ª illustrates a modification of the apparatus shown in Fig. 2.

Figs. 3 and 3ª show respectively in side elevation and in cross section a compound track contact as would be used in conjunction with the apparatus shown in Figs. 1 and 2 for producing a warning operation on a train.

Figs. 4 and 4ª show respectively in side elevation and in cross section a similar compound track contact for producing a stopping operation on a train.

Fig. 5 is a plan corresponding to Figure 4.

Fig. 6 shows a variation of Figure 5.

Figure 7:
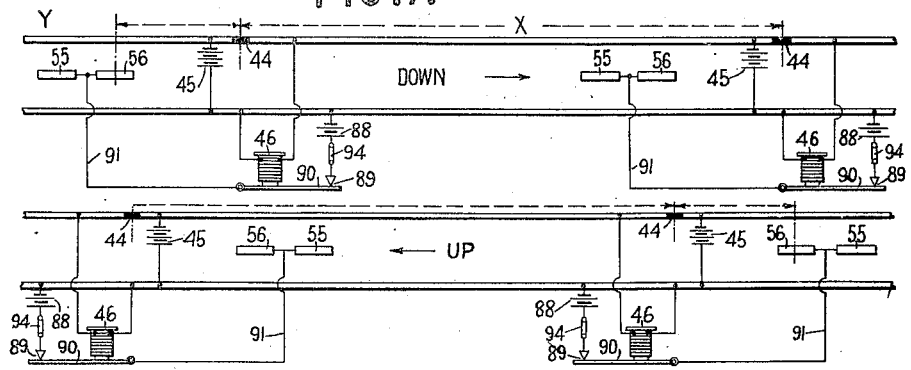
Figure 7A:
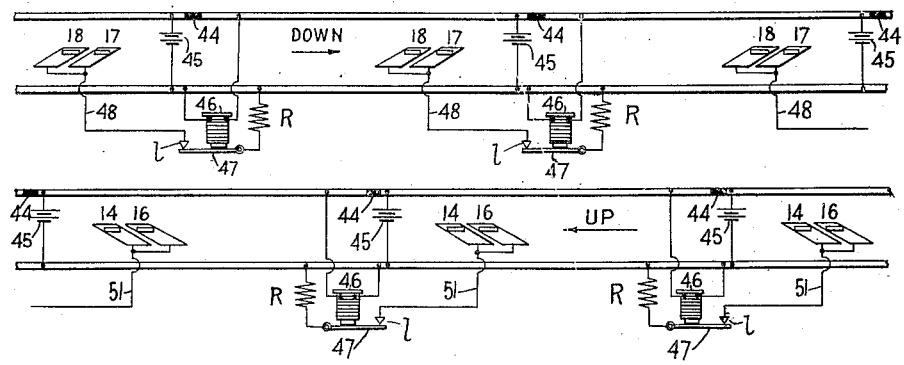

Fig. 7 shows a stretch of double track adapted according to these improvements.

Fig. 7ª shows a stretch of double track adapted for use with a locomotive equipped as in Fig. 2 or 2ª.

Figure 8:
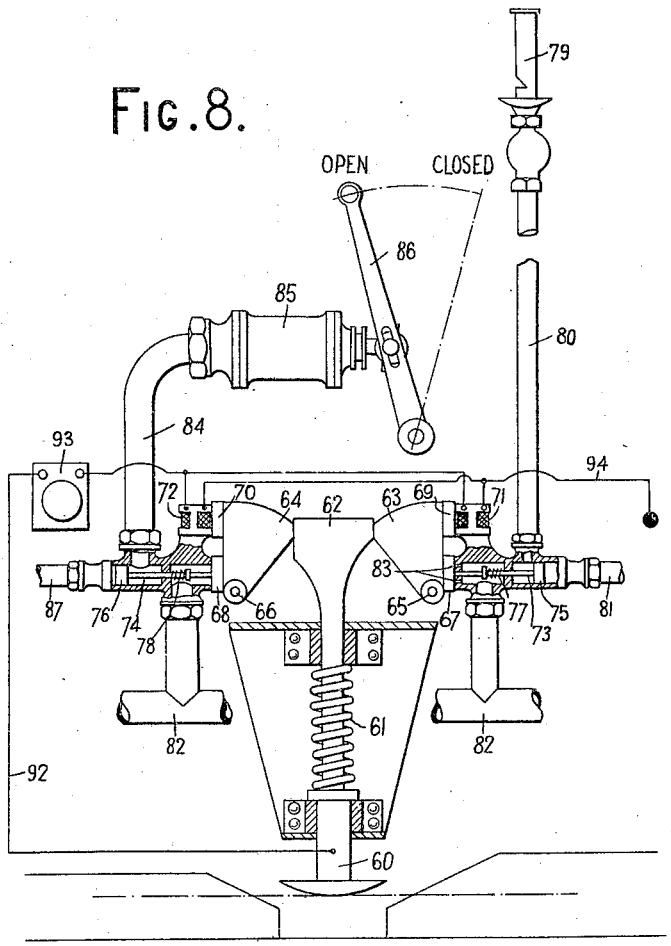

Fig. 8 shows one type of train apparatus which may be used in connection with apparatus according to this invention, as shown in Figure 7.

Fig. 9 shows a variation of the apparatus shown in Figure 8.

Figure 10:
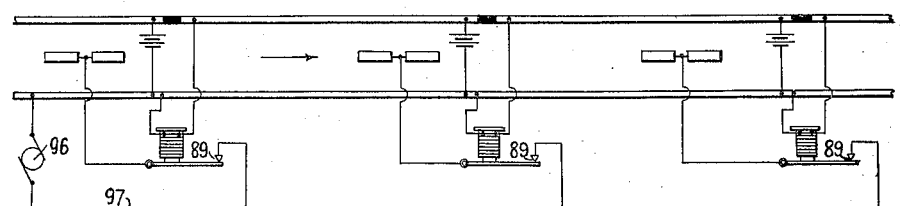

Fig. 10 shows how a single generator and a common line wire may be used instead of a succession of track batteries.

Figs. 11 and 11ª show respectively in side elevation and in cross section a track contact adapted for use with train apparatus as shown in Figures 8, 9, and 19 for producing a warning operation on a train.

Figures 12 and 12ª show respectively in side elevation and in cross section a track contact similar to the one shown in Figures 11 and 11ª and adapted to produce a stopping operation on a train.

Figure 13:
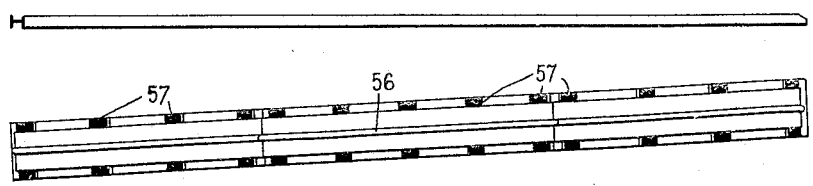

Figure 13 shows how track contacts such as those shown in Figures 11 and 11ª, and 12 and 12ª may be placed midway of the rails and askew or aslant thereof.

Figs. 14 and 15 show how conflicting roads cannot be made at the same time.

Fig. 16 shows how a train on a siding is prevented from being moved sufficiently to foul the main line of a section after another train has already entered this section.

Figure 17:
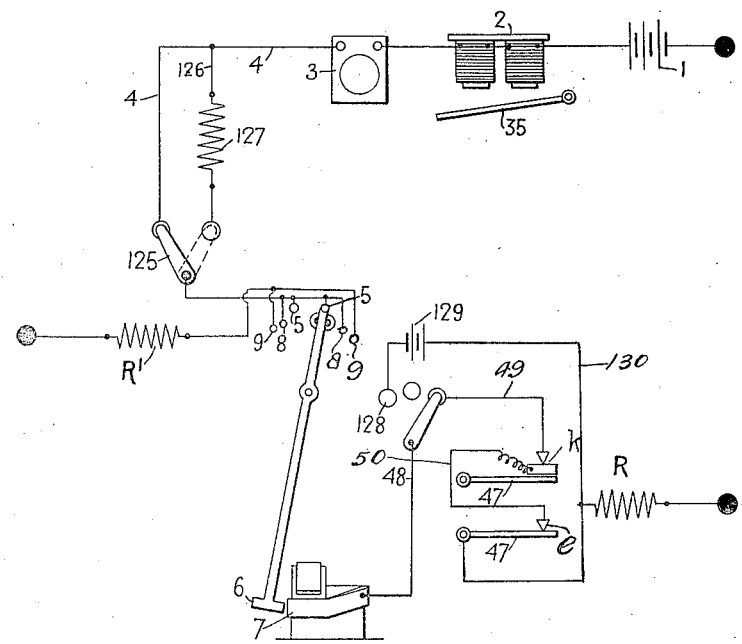

Fig. 17 shows a variation of the apparatus shown in Figures 1 and 2 whereby two trains may be brought into the same section, as for example when shunting or similar operations are necessary, as a result of the deliberate connivance of both engine driver and signalman.

Figure 18:
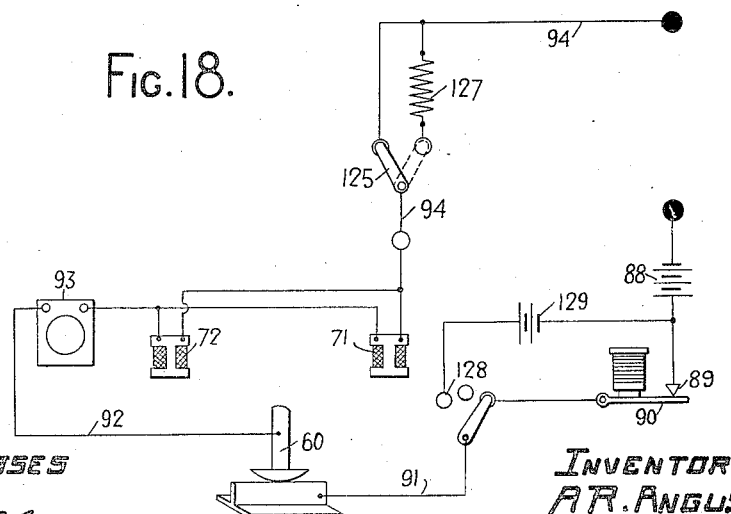

Fig. 18 shows a variation of the apparatus shown in Figures 7, and 8 or 9 for the same purposes as stated in connection with Figure 17.

Fig. 19 shows a variation of the locomotive apparatus shown in Fig. 8.

In the apparatus used in connection with single lines as shown in Figures 1 to 6 inclusive there are arranged on or about the railway tracks what may be termed compound track contacts 14, 16, 17, and 18 (Fig. 1). Each of the compound contacts shown has a base of some suitable material as wood and has a top contact plate 12 or 13 and side contact plates 7 preferably arranged around the base as shown. All the compound track contacts are so arranged that a line drawn through their centres would lie to one side of and be parallel to a line drawn centrally of the track and parallel to the track rails; in this way the side contacts 7 (Figs. 3, 4, 5, 6) are adapted so as to effect the lateral displacement of a contacting device 6 (Fig. 2) into the positions shown dotted when it will either contact with contact 5 or connect together contacts 8 and 9 by means of an insulated plate.

The contacts 7 are of the shape shown in the figures so as to displace the contacting device 6 without shock or jar and may be so arranged that the contacting device 6 is always displaced to one of the dotted positions shown in the Figure 2 before the shoe 11 (Figures 2 and 2ᵃ) of a contacting device interacts with the top contacts 12 or 13 so as to tend to produce warning and stopping operations respectively on the train. If desired the top contacts 12 and 13 may be placed externally to the contacts 7 and may be placed outside the railway tracks instead of within as shown in Figure 1. The contacts 7 may be similarly placed if so desired. The contact 13 which is adapted to cause the stopping operation preferably effects a greater displacement of the shoe 11 than the contact 12 which is adapted to produce a warning operation.

The shoe 11 (Fig. 2) is attached to any suitable vehicle such as a locomotive or brakevan and is adapted to be definitely displaced when interacting with track contacts such as 12 and 13 placed on or about or above the railway tracks and when not in interaction with these track contacts may be returned to its normal or lowest position by a spring acting on it in addition to gravity though it may be held in normal position by one or more springs only or by gravity only.

Attached to and insulated from the shoe 11, are contact plates normally contacting with contacts 19 and 20 and thus completing the circuits from the generator 21 by contacts 22 and wire 23 and (a) by contacts 19 wire 24 coils of solenoid 25 and magnet 26 contacts 27 if bridged by insulated contact plate of handle 28 and wire 29 back to the generator 21 thereby energizing the solenoid 25 and holding closed the valve 30 so as to prevent the danger whistle 31 from being blown and also energizing the magnet 26 and attracting its armature so as to maintain the miniature visual signal in the clear or off position; and (b) by contacts 20 wire 32 coils of solenoid 33 contacts 27 if bridged by handle 28 wire 29 back to the generator 21 thereby energizing solenoid 33 and holding closed the valve 34 controlling means either for shutting off the motive power on the locomotive or for applying the brakes or both.

When the shoe 11 comes into contact with a warning contact 12 it is displaced to such an extent that the contacts 19 are separated, thereby breaking there as far as these contacts are concerned the circuit relating to the solenoid 25 and the magnet 26 so that if the said circuit is not otherwise maintained the plunger of the solenoid 25 is forced out by whatever fluid pressure may be acting on the valve 30, the danger whistle 31 is blown and the miniature signal is raised into the on or danger position.

When the shoe 11 comes into contact with a stop contact 13 it is displaced to a greater extent than when it comes into contact with a warning contact and the contacts 20 in addition to contacts 19 are also broken thereby further breaking as far as these contacts are concerned the circuit of the solenoid 33 so that if the said circuit is not otherwise maintained the plunger of the solenoid 33 is forced out by whatever fluid pressure may be acting on the valve 34 and the handle 28 (used for replacing the plunger) is moved so that the circuit of the generator 21 to the coils of the solenoids 25 and 33 and magnet 26 are broken at contacts 27.

It is intended that the opening of the valve 34 which is normally held closed by the plunger of the solenoid 33 should allow of the admission of suitable fluid pressure as that of steam air or gas to a suitable cylinder the piston of which is adapted to shut off the motive power such as steam air gas or the like of the locomotive and should also allow or cause the operation of means for applying the brakes on the train. Either the shutting off of the motive power or the application of the brakes or both may be controlled by the valve 34 and used for stopping the train.

If current of a predetermined normal value flows from the generator 1 through the coils of electromagnet 2, the armature 35 is attracted to contact with contacts 36 and 37 and completes the alternative paths to the solenoids 25 and 33 and magnet 26 through wire 38 which is joined to wire 24 and wire 39 which is joined to wire 32.

Should current exceeding the predetermined normal value pass through the coils of electromagnet 2 the armature 35 would be attracted with sufficient force against gravity and the springs 40 and 41 to lift the arm 42 from its normal position as shown in the figure and thus break the circuit of the generator 21 at contacts 22 thereby effecting warning and stopping operations on the train.

Moreover should current whose strength is below the predetermined normal value flow through the coils of electromagnet 2 the armature 35 would not be attracted against gravity and the spring 40 and the train would be warned and stopped on the corresponding track contacts.

These warning and stopping operations will be restrained when the train interacts with the track contacts if predetermined normal current flows through the electromagnet 2, and this will depend in this case on the two sections ahead of the train being unoccupied.

For example the train running on the down journey in the direction of the arrow (Fig. 1) and interacting with track contacts 18 and 17 at A which are respectively a warning and a stopping contact will obtain clearance if the sections G, C, and F, D, immediately ahead of it are unoccupied.

The track rails are bonded and one is divided up into sections by insulating joints 44 and equipped with the ordinary track circuit comprising a track battery 45 at one end of a section and a track relay 46 at the other end.

When the sections are unoccupied the armatures 47 of the track relays 46 are attracted and close the contacts $k$, and $e$, of which the contacts $k$ are insulated from the armatures 47; and when a section is occupied the relay 46 is shunted and its armature 47 breaks contact at these contacts $k$ and $e$. Any suitable resistance may be used with the track batteries 45.

A train running on the down journey and interacting with the track contacts 18 and 17 at A will obtain clearance if the circuit of its generator 1 is completed through the coils of electromagnet 2, bell or buzzer 3, wire 4, contact 5, shoe 6, (the track contacts at A being of the shape shown in Figure 5 and thus displacing the shoe 6 to contact with contact 5) contact 7, wires 48 and 49 (Fig. 1) contacts $k$, wire 50, contact $e$, armature 47 resistance R the rails and frame and back to the generator 1. Current of predetermined normal value will flow through the coils of electromagnet 2 the warning and stopping operations will be restrained and the bell or buzzer 3 will indicate line clear.

Should however either of the sections G, C, and F, D, be occupied this circuit will be broken at contacts $k$ or contacts $e$ and the train will be warned and stopped.

The shoe 6 is insulated from the frame of the locomotive and the resistance R is inserted in the circuit last mentioned so that should a short circuit occur current greater than the predetermined normal value (which is governed by the value of the resistance R) would flow through the coils of electromagnet 2 and the train would be warned and stopped as previously described.

Continuing on the down journey the train interacts with track contacts 14 and 16 at G which are respectively stopping and warning contacts and are intended to control the train running on the up journey. These track contacts are of the shape shown in Figure 6 and a train running on the down journey is always able to obtain clearance over them as the shoe 6 is on account of the non-central position of the track contacts and of their shape, deflected to the side opposite to that to which it was deflected on making contact with track contacts 18 and 17 and to the greater extent necessary to enable it to connect together contacts 8 and 9 (Figure 2) and complete the circuit of electromagnet 2 through contacts 8 and 9 and resistance R' to the frame.

Otherwise a train running on the down journey interacting with these track contacts at G would be stopped by a following train on either of the two sections in its rear and this is not desirable.

If desired the generator 1 may be placed on the track where the resistance R is now shown instead of on the locomotive and the resistances R and R' may be omitted a suitable generator being also placed in the lead from contact 9 to the frame.

The train running on the up journey and interacting with the track contacts 16 and 14 at E of which 16 is a warning contact and 14 a stopping contact will obtain clearance if the circuit of its generator 1 is completed through the locomotive apparatus as previously described the contact 7 and thence by wires 51 and 49 contacts $k$ wire 50 contact $e$, armature 47, resistance R, rails and frame.

Should either of the sections G, C, and F, D, be occupied however this circuit will be broken at contacts $k$ or $e$ and the train will be warned and stopped.

Any switch or contact switches may be inserted in the circuits of the track contacts to enable a signalman to break a circuit and so prevent a train entering a section if necessary.

It is thus obvious that for either direction of running a train must always ascertain if either of the two sections ahead of it is occupied and will be warned and stopped should this be the case.

The stopping track contacts 17 and 14 are placed at such a distance from the adjacent insulating joints 44 that a train which has had its stopping operations performed when interacting with either of them will be brought to a standstill before reaching the corresponding insulating joint 44.

The reason for detecting two sections ahead on single lines is now apparent, for imagine the down train between the track contacts at A and the adjacent insulating joint 44 and an up train interacting with the track contacts 16 and 14 at E. These trains will both obtain clearance over the track contacts and will not be warned and stopped until they interact with the track contacts at C and F respectively which are placed far enough apart to prevent their colliding. Protection is thus given to approaching trains travelling on the same line and it is of course obvious that following trains are amply protected.

A variation of the locomotive apparatus is shown in Figure 2ª where instead of the shoe 6 swinging radially about a pivot it is always maintained in the vertical position and deflected either to the right or to the left the track contacts being suitably adapted for this purpose. The contacts 5, 8, and 9 of the locomotive apparatus are duplicated as shown in both Fig. 2 and Fig. 2ª for the purpose of enabling the apparatus of a train which has been turned on a turntable, triangle, loop, or the like to interact correctly with the track apparatus.

Also if desired the locomotive apparatus may be of the open circuit type as hereinafter described with reference to Figures 8 and 9.

In the apparatus used in connection with double lines Figs. 7 to 13 inclusive where trains usually run in the same direction on each particular rail there are arranged on or about the railway tracks track contacts of the type shown in Figures 11, 11ª and 12, 12ª. These contacts comprise a base of some suitable material such as wood and a top contact plate 55 or 56 the latter of which effects a greater displacement of a contacting device interacting therewith than the former. These top contacts may be further insulated by resting on suitable blocks of insulating material 57.

Figure 13 shows a plan of one of these track contacts and illustrates a preferred method of arranging them askew or aslant of the track for the purposes of increasing the wearing area of a contacting device interacting therewith.

The railway tracks are similarly adapted as for single lines inasmuch as they are equipped with the ordinary type of track circuit comprising track batteries 45 track relays 46 and bonded rails one of which is divided up into sections by suitable insulation joints 44. The shoe 60 (Fig. 8) is attached to and insulated from a suitable vehicle such as a locomotive and is adapted to be differently displaced when interacting with track contacts such as 55 and 56 placed on or about or above the railway tracks and when not in interaction with them is returned to its lowest or normal position by a spring 61 acting on it in addition to gravity though it may be held in the normal position by one or more springs only or by gravity only. The part 62 of the shoe 60 is adapted to restrain mechanically or hold in their normal positions sector shaped pieces 63 and 64 pivoted at 65 and 66 respectively. To the sectors 63 and 64 are attached doors or the like 67 and 68 and armatures 69 and 70 respectively.

These armatures 69 and 70 pertain respectively to electromagnets 71 and 72. Against the doors 67 and 68 press piston rods 73 and 74 behind the pistons 75 and 76 of which is suitable fluid pressure as that of steam air or gas tending to move or push out the pistons 75 and 76 and in addition there are springs 77 and 78 also tending to push the piston rods 73 and 74 out and thus open the doors 67 and 68. In addition to these forces acting on the doors and tending to open them there is also the weight of the sectors which would alone be sufficient to cause them to fall or be moved unless restrained by some part such as 62 of the shoe 60.

The shoe 60 is arranged so that if it becomes displaced from its normal position its relative doors or sectors will be moved so as to produce on the train a warning or a stopping operation or both.

The casing in which the piston 75 is located comprises two separate compartments one of which is connected with a danger whistle 79 by a pipe 80 and is also connected by the pipe 81 with a source of suitable fluid pressure as that of steam air or gas. Normally this fluid pressure is cut off from the danger whistle 79 by the piston 75 which is pushed into the position shown in the figure by the door 67. When the door 67 falls or moves the piston 75 is moved or forced out by the fluid pressure behind it and by the spring 77, communication is made to the pipe 80 and the danger whistle 79 is blown until the door 67 is replaced.

For the purpose of reducing the shock which might otherwise accompany the automatic stoppage of the train at the succeeding stopping contact 56 the other compartment communicates with the train pipe 82 of the fluid pressure brakes, and, when the door 67 falls or moves, with the atmosphere by means of a small orifice or orifices 83, so that when the door 67 falls or moves a service or partial application of the brakes is effected.

The casing in which the piston 76 is located comprises two separate compartments one of which is connected by a large pipe with the train pipe 82 of the fluid pressure brakes and the other is connected by a pipe 84 with the cylinder 85 in which is a piston whose piston rod is connected directly or through a link with the driver's handle 86.

The end of the cylinder nearer the door 68 is quite open to atmosphere if not blocked up by the door 68 and when this door moves or falls the train pipe 82 is connected directly to atmosphere and an emergency application of the brakes is effected.

The other compartment is connected by a pipe 87 with a source of fluid pressure such as aforesaid and normally this fluid pressure is cut off from the cylinder 85 by the piston 76 which is pushed into the position shown in the figure by the door 68. When the door 68 falls or moves sufficiently the piston 76 is moved or forced out by the fluid pressure behind it and also by the spring 78, communication is made with the pipe 84 and the cylinder 85 and the driver's lever 86 is forced over to the shut or off position.

When the locomotive interacts with a warning track contact 55 the shoe 60 is lifted or moved to such an extent that the part 62 is raised or moved clear of the sector 63 only and the sector 63 unless otherwise restrained will at once fall or move carrying with it the door 67 when the danger whistle 79 will be blown and a service or partial application of the brakes will ensue until the door 67 is replaced in the position shown in the figure.

It will be seen that while interacting with a warning contact the sector 64 will not fall or be moved because the contacting face of the part 62 which engages with the sector 64 is longer than the contacting face which engages with the sector 63. When the locomotive interacts with a stop contact such as 56 the shoe 60 is moved or displaced to a greater extent than when the locomotive interacts with a warning contact 55 and the part 62 is thus lifted or moved clear of both sectors 63 and 64. These will at once move or fall carrying with them the doors 67 and 68 unless otherwise restrained when the danger whistle will be blown brakes will be applied and the motive power of the train will be cut off.

The sectors 63 and 64 may be returned to their normal positions shown in the drawings by suitable levers and means may be provided for preventing the driver from restarting the train if it has been automatically stopped by the track contact. For example the lever for restoring the sector 64 may be kept in a locked box the key of which is in the possession of the guard or some other official.

The construction and operation of apparatus similar to that shown in Fig. 8 are described and illustrated in the specification of my Patent 1,415,214 dated the 9th May 1922 in which claims relating thereto are made and I would have it understood that I do not herein claim anything described and claimed therein.

In order to prevent these warning and stopping operations from being effected when a locomotive interacts with the track contacts sufficient current must flow through the coils of the electromagnets 71 and 72 to hold the armatures 69 and 70 and the sectors 63 and 64 are then maintained in their normal positions as shown and neither a warning nor a stopping operation is performed.

This will be the case when a train about to enter a section X, (Fig. 7) which is unoccupied, interacts with track contacts 55 and 56 at Y current flowing from a suitable track battery or generator 88 through contact 89 and armature 90 (which are in contact if the section X is unoccupied) wire 91 track contact 55 or 56 shoe 60 (Fig. 8) wire 92 bell or buzzer 93 the coils of electromagnets 71 and 72 wire 94 to the frame and rails back to the generator 88.

The train thus obtains clearance over these track contacts and is enabled to enter the section X if it is unoccupied and all is in order. Should it be occupied the relay 46 will be shunted, the armature 90 will break contact with contact 89 and the train will be warned and stopped on contacts 55 and 56 respectively.

The distance of the stopping contact 56 from the adjacent insulated joint 44 is preferably such that the train will be brought to a standstill before passing over the insulated joint 44. Any switch such as 94 may be inserted in this circuit at any suitable place to enable a signalman or other person to break the circuit and thus prevent a train entering the section if desired, and this circuit may also be broken by contacts placed on the arm of a track signal or duly operated by the same when in the on or danger position or by any points or switches which have not been properly operated.

Figure 10 shows a method whereby a generator 96 and a common line wire 97 connected to any suitable number of contacts 89 may be used instead of separate track batteries or generators 88 shown in Figure 7.

In Figure 9 is shown a variation of the locomotive apparatus shown in Figure 8 in which instead of using sectors 63 and 64 suitable dogs 98 and 99 fixed to the doors 67 and 68 respectively are adapted to engage in slots 100 and 101 respectively cut in a shaft 102 which moves vertically in parallel guides 103.

Normally this shaft 102 is in the position shown when the doors 67 and 68 disconnect the train pipe 82 from atmosphere the pipes 81 and 87 from pipes 80 and 84 which pertain to the danger whistle 79 and cylinder 85 respectively (see Figure 8) but on the shoe 60 interacting with a warning contact 55 the shaft 102 is lifted clear of the dog 98 and the door 67 is at once forced out with corresponding results as previously described and on interacting with a stop contact such as 56 the shaft 102 is still further displaced and lifted clear of the dog 99 so that the door 68 in addition is also forced out with corresponding results.

In slots cut in these dogs 98 and 99 are inserted cranks 202 and 203 pivoted at 104 and 105 respectively to the shafts of which are connected suitable arms 106 and 107 loaded with weights 108 and 109 each crank and arm thus constituting a weighted lever. It is thus seen that in addition to the springs 77 and 78 and the fluid pressure at the back of the pistons 75 and 76 tending to force out the doors 67 and 68 there are also the weights 108 and 109 acting through the cranks 202 and 203 and tending to do the same. Each dog together with the door to which it is fixed may be returned to its normal position by means of the corresponding lever. In its normal position as shown the base of the shaft 102 rests on the top of the shoe 60 being preferably maintained in this position by gravity and the spring 110. The shoe 60 is also held in its normal position as shown by a suitable spring such as 111 and is insulated from the base of the shaft 102 and also from the rest of the frame of the locomotive. Though the shoe 60 and the shaft 102 are thus separate they are loosely connected by a link 60ª (though still insulated from one another) so that in the event of the shoe 60 falling off or being displaced from its normal position it will pull the shaft 102 with it thus freeing the dogs 98 and 99 and performing warning and stopping operations on the train. The base of the shaft 102 is preferably of the shape shown so that if desired its weight may be suitably increased.

The energizing of the electromagnets 71 and 72 as before results in the attracting of the armatures 69 and 70 and the consequent restraining of warning and stopping operations. The operation otherwise is similar to that described in connection with Figure 8.

*Figure 7ª.*—Where it is desired that a locomotive equipped as shown in Figures 2 and 2ª in which a laterally movable shoe is used should run over double tracks in which one direction of motion is usually maintained the said tracks may be adapted as shown in Figure 7ª.

It will be seen that this figure is only a variation of Figure 1 omitting unnecessary track contacts and detecting only one section ahead instead of two as in Figure 1.

The train running on the down line and interacting with track contacts 18 and 17 will obtain clearance if their connection to the rail through wire 48 contact 1, armature 47 of the track relay and resistance R is completed, and the distance of stopping contact 17 from insulated joint 44 is such as to bring the train to a standstill before reaching the joint 44.

Conversely on the up journey the train interacting with track contacts 16 and 14 will obtain clearance if their connection to the rail through wire 51 contact 1, armature 47 and resistance R is completed the stopping contact 14 being placed at such a distance from the insulated joint 44 as to prevent the train entering the section if occupied.

Instead of being equipped with a closed circuit as shown in Figures 2 and 2ª the locomotive may if desired have the open circuit apparatus described in Figure 8 or 9.

Where two or more railway tracks meet or cross, the controlling circuits from the respective track contacts may be threaded through suitable point detectors in such a way that only one road can be made at a time.

For example in Figure 14 a train equipped as shown in Figure 8 running on the up journey in the direction of the arrow on the branch line will on interacting with track contacts 55 and 56 at Z obtain clearance if the points are set for the branch line, if the section in question is unoccupied, and if the signalman's switch 94 is closed for the branch line.

It will be seen that the section of track guarded by a track relay 46 which is energized by the battery 45 extends not only along the main line between the insulated joints 44 and 44, but also for a suitable distance along the branch line Z. Any vehicle occupying this section will thus shunt the relay 46 when its armature 90 will drop and break contact at contact 89. If the section is unoccupied and the points are made for the branch line Z the circuit of the track contacts 55 and 56 of the branch line will be completed through wire 91 threaded through suitable point detector contacts 115 and 116 switch 94 armature 90 contact 89 and generator 88 to the rail and the train will obtain clearance; at the same time the circuit from the track contacts 55 and 56 on the main line is broken at their point detector contacts 117 and 118 respectively and a train interacting with them will be warned and stopped. The signalman's switch 94 is used to enable the signalman to control the traffic at this point and it is obvious that he can only make one road at a time.

In Figure 15 the wire 91 from the track contacts 55 and 56 is threaded through suitable point detector contacts in such a way that a train interacting with these track contacts will only obtain clearance if the points are correctly set for either the main or branch line and the section comprising part of the main line and part of the branch line is unoccupied and the signalman's switch 94 is closed.

As before the track battery 45 energizes a track relay 46 if no vehicle is standing on the bonded section of the main or branch line and the circuit from track contacts 55 and 56 is completed through wire 91 contacts 120 and 121 (if the road is made for the branch line) or contacts 122 and 123 (if the road is made for the main line) switch 94 armature 90 contacts 89 generator 88 to the rails.

*Figure 16.*—Figure 16 shows how a train on a siding is prevented from being moved sufficiently to foul the main line of the section after another train has already entered this section.

The main line is divided into the usual track circuited sections one of which extends between the insulated joints 44 at M and N and comprises the usual track generator 45 and track relay 46 connected to the track contacts 55 and 56 which are adapted for a train running on the up journey in the direction of the arrow.

A length Q extending from the junction of the siding and the main line for some distance along the siding is of such a length as to prevent any part of a train standing on the siding beyond the distance Q from fouling a train on the main line. To this length Q is added a length of track T determined as hereinafter described and at this point O will be placed an insulated joint 44 the track circuit thus extending along the siding as far as this point O.

Close to the point O is placed the first of a series of track contacts 135 on the siding the distance between any two of which is equal to the distance T. This distance T is determined as follows:—

To reduce the number of ramps 135 placed on the siding they must on a long siding be placed further apart than on a short one. For example in the figure three track contacts 135 are shown separated by a distance T, but if the siding was twice as long to still keep the same number of track contacts, namely three, the length T would have to be doubled.

Assume a train has entered the siding engine first and has completely passed off the track circuited portion and beyond the insulation joint at O. A train on the main line running on the up journey on interacting with track contacts 55 and 56 will thus obtain clearance and enter the section. After it has done so, the train on the siding might then unless otherwise prevented back out on to the main line so as to foul it and collide with the train on the main line.

It is prevented from doing this by the track contacts 135, which are all stop contacts, in the manner hereinafter explained, but the tail of the train may pass over the insulated joint at O and run along towards the main line for a distance T before the contacting device on the locomotive interacts with one of these track contacts 135. It will then be stopped if a train is on the main line and the tail of the train will thus, though extending along the track circuited section, not have entered the fouling length Q and thus no collision can occur between the two trains.

It is thus obvious that this distance T depends on the length of the siding and the number of track contacts to be placed thereon and is such that it will prevent a train on the siding from backing out and fouling the main line after another train on the main line has entered the track circuited section.

The method of controlling these track contacts 135 placed on the siding will now be explained.

In addition to the track contacts 55 and 56 and preferably between them are placed other track contacts 136 and 137, at each end of the section of track circuit M and N and also close to the insulating joint O a non polarized relay comprising an armature 138 which is adapted to contact with the contact 139 when the electromagnet 140 is energized and to break contact with it when the electromagnet 141 is energized is also used connected to a generator 142.

The track contacts 136 are all connected together and by a wire 143 to the coils of electromagnet 140 so that when a train interacts with these track contacts 136 it will complete the circuit of the generator 142 to electromagnet 140 and will thus close contact 139.

The other track contacts 137 are also all connected together and by a wire 144, to the coils of electromagnet 141 and when a train interacts with these track contacts 137 it will then open the circuit at contact 139. The siding track contacts 135 are all common and connected to contact 139 and the armature 138 is connected to the continuous rail through the resistance $R^3$ and a generator 145.

The operation is then as follows:—

A train running on the up main line can enter the section M, N, if the train on the siding is wholly clear of the track circuited section extending to the insulated joint at O. On interacting with the contact 137 it will have energized the electromagnet 141 by allowing current to pass from the generator 142 through electromagnet 141 wire 144 track contact 137 the locomotive apparatus the frame and rails back to the generator 142 and the armature 138 will have been moved into the open position breaking contact with the contact 139. This main line train thus enters the section M N and should a train on the siding now attempt to back out, its last vehicle can run along beyond the insulated joint at O for a maximum distance T, before the contacting device on its locomotive interacts with one of these siding track contacts 135. On doing so, it will at once be stopped as the circuit from the track contact 135 to contact 139 armature 138 resistance $R^3$, generator 145 the rails and frame and the locomotive apparatus is broken at contact 139, and it is thus unable to foul the train passing on the main line.

This latter train proceeding on its way on interacting with the track contact 136 at M, allows the generator 142 to energize the electromagnet 140 and close the contact 139 and the train on the siding can then back out on to the main line. So that a train shunted on to a siding may not thus permanently block the main line section M N it will on entering the siding and passing over track contact 136 at O also effect the closing of contact 139 thus in addition to freeing the main line allowing itself to obtain clearance over the siding track contacts 135.

Figure 17 shows an adaptation of the apparatus shown in Figs. 1 and 2 for enabling a train to be brought into an already occupied section as for example when shunting or similar operations are necessary. This is possible only as the result of the deliberate acts of both the engine driver and the signalman. To the locomotive apparatus is added a driver's switch 125 which is normally in the position shown in full in the figure and when moved over into the dotted position connects up in series a resistance 127 sufficient to greatly reduce the current which, the track apparatus being in its normal condition, would otherwise pass from generator 1 through the electromagnet 2 thus rendering it insufficient to attract the armature of electromagnet 2. The signalman's switch pertaining to each of the two sections in question—namely, the occupied section and the section immediately preceding it—which would normally be moved to the position shown in full to allow a train to enter the section is now moved to contact with contact 128, connected to an auxiliary battery 129 thence by wire 130 to the resistance R connected to the armature of the relay of the section next in advance of the last mentioned section.

As a result the circuit of the generator 1 is now completed through electromagnet 2 bell or buzzer 3 wire 4 branch wire 126 resistance 127 switch 125 contact 5 shoe 6 track contact 7 wire 48 contact 128 generator 129 wire 130 resistance R rails and frame of the locomotive.

The addition of the generator 129 thus compensates for the insertion into the circuit of the resistance 127 and normal current flows through the electromagnet 2 despite the fact that the next but one or the next section as the case may be is occupied and a train is thus able to obtain clearance over the track contacts and enter the occupied section.

The driver's and the pertinent signalman's switches must both be operated to obtain the desired result as regards each of the sections in question: for should only the driver's switch 125 be moved and not the signalman's switch the circuit of the electromagnet 2 and the bell or buzzer 3 would be merely broken by the occupation of the section and should a signalman's switch be moved to contact with contact 128 and the driver's switch remain in the position shown in full in the figure the generators 1 and 129 would now be in series and cause an excessive current to pass through the coils of the electromagnet 2 thus warning or warning and stopping the train as the case may be.

It will be understood that each of the two sets of compound contacts 18 and 17 relating respectively to the first and second sections to the rear of the occupied section is provided with track apparatus as shown in Fig. 17.

Figure 18 shows how these results may also be obtained when apparatus such as that shown in Figure 7, 8, or 9 is used.

As before the driver's switch 125 and the resistance 127 are added to the locomotive apparatus and an auxiliary generator 129 connected to another contact 128 of the signalman's switch. The operation is similar to that described with reference to Figure 17 but as no electromagnet 2 is used in this figure it is necessary to insert an overload circuit breaker or cut out in the wire 94 to stop the train should only a signalman's switch have been operated and not the driver's switch 125.

In Figures 1, 2 and 2$^a$ is shown a method of adapting these improvements for single tracks where trains run in either direction in which it is necessary to equip the locomotive with two contacting devices.

Figures 7, 8 and 9 show how double tracks may be equipped in which trains run in the same direction characterized by the fact that only one shoe is used.

The locomotive apparatus (Fig. 19) resembles that shown in Figure 8 but with the addition of means for controlling the production of a line clear operation comprising a third sector 63$^a$ a door 67$^a$ and an armature 69$^a$, etc., controlled by an extension 62$^a$ of the head 62 of the shoe 60 and of means whereby a warning or a stopping operation is adapted to be produced on the train unless the track apparatus is in such a condition as to cause current of predetermined normal strength to flow through train apparatus.

On the locomotive interacting with a warning contact 151 which is similar to that shown in Figures 11, 11$^a$, the shoe 60 is displaced to such an extent that the parts 62 and 62$^a$ lose their hold of the sectors 63, 63$^a$ and unless otherwise restrained both these sectors will then fall as previously described resulting in a danger whistle 79 being blown the train pipe 82 being connected to atmosphere through small orifices 83 thus giving a service application of the brakes and the line clear whistle 79$^a$ also sounding. Further on interacting with a stopping track contact such as 152 the shoe 60 will be lifted to such an extent that the three sectors 63, 63$^a$ and 64 would all fall as previously described unless otherwise restrained thus further resulting in an emergency application of the brakes being effected and the driver's regulator 86 moved over to the shut or off position.

On the other hand when the locomotive interacts with a warning contact 151 and the external circuit thereto is satisfactorily completed so that normal current flows from the generator 160 through the coils of electromagnet 161 the armature 162 is attracted to contact with contact 163 and to break the contacts 164. The circuit of the generator 165 is then completed through the contacts 166 arm 167 contact 163 armature 162 wire 168 the coils of electromagnets 71 and 70 wire 169 thus restraining the warning and stopping operations on the train. At the same time the circuit of the generator 170 though at first completed through the coils of electromagnet 71$^a$ wire 171 contacts 164 wire 172 contacts 173 (which are closed by a slight movement of the shoe 60) and wire 174 is broken at contacts 164. The sector 63$^a$ is thus not restrained and falls and communication is effected between the pipe 81$^a$ and the line clear whistle 79$^a$ which is thus sounded.

Should the external circuit from the track contact 151 not have been satisfactorily completed the armature 162 would not have been attracted by the electromagnet 161. The circuit of the generator 165 would not then have been completed and the sector 63 would fall resulting in a service application of the brakes and the sounding of the danger whistle 79. But the circuit of the generator 170 to the coils of electromagnet 71$^a$ will now be completed at both contacts 164 and 173 thus restraining the sector 63$^a$ from falling and the line clear whistle 79$^a$ would remain silent. When the locomotive interacts with a stopping contact which is similar to that shown in Figs. 12 and 12$^a$ these operations would again be repeated with the addition of an emergency application of the brakes and the shutting off of the motive power in the case when the external circuit of the track contact was not satisfactorily completed.

What I claim and desire to secure by Letters Patent of the United States is:—

1. Electrical train-controlling apparatus comprising locomotive apparatus carried by a locomotive and including electro-responsive means whose movable part is adapted to occupy a line-clear and a danger position in accordance with two conditions as to electrification of said electro-responsive means and safety means on the track adapted when in a normal position to be caused by the occupation by another vehicle of a portion of said track to prevent said locomotive from approaching said other vehicle along said portion of track by preventing said electro-responsive means from being in the line-clear condition as to electrification, said locomotive apparatus and said safety means being both adjustable into abnormal positions and being adapted when in said abnormal positions but not when only said locomotive apparatus or only said safety means is in its said abnormal position to cause said electro-responsive means to be in its said line-clear condition.

2. Electrical train-controlling apparatus comprising locomotive apparatus carried by a locomotive and including electro-responsive means whose movable part is adapted to occupy a line-clear and a danger position in accordance with two conditions as to electrification of said electro-responsive means, a track contact on the track, and safety means on the track adapted when in a normal position to be caused by the occupation by another vehicle of a portion of said track to prevent said locomotive from approaching said other vehicle along said portion of track by preventing said electro-responsive means from being in the line-clear condition as to electrification when said locomotive is in contact with said track contact, said locomotive apparatus and said safety means being both adjustable into abnormal positions and being adapted when in said abnormal positions but not when only said locomotive apparatus or only said safety means is in its said abnormal position to cause said electro-responsive means to be in its line-clear condition.

3. Electrical train-controlling apparatus comprising on a locomotive an electro-responsive device adapted, only when energized by current of normal strength, to cause its movable part to occupy a line-clear position, a circuit portion including said electro-responsive device, means for enabling the driver to cause said circuit portion to be in an abnormal condition when it is intended that said locomotive should approach a vehicle occupying the same portion of track as said locomotive and on the track a track contact, a circuit portion adapted on contact of said locomotive with said track contact and when said circuit portion on said locomotive is in a normal condition to cause current of normal strength to energize said electro-responsive device if the portion of track occupied by said locomotive is unoccupied by another vehicle, and means for enabling a signalman to cause said circuit portion on the track to be in an abnormal condition when it is desired to allow said locomotive to approach another vehicle occupying the same portion of track as said locomotive so that current of normal strength energizes said electroresponsive device when said locomotive is in contact with said track contact only if said circuit portion on said locomotive and said circuit portion on the track are both in normal conditions or both in said abnormal conditions.

4. A train protecting device comprising the track having a normally closed electric circuit, track contacts co-operating with the track circuit, warning and stopping means on the train, pistons controlling the operation of the warning and stopping means, pivotally mounted sectors restraining the operation of the pistons, and a train contact coacting with the track contact adapted to engage at the upper end with the said sectors.

Dated the seventeenth day of September, one thousand nine hundred and thirteen.

ARTHUR REGINALD ANGUS.

Witnesses:
GEO. C. CORSELLIS,
M. A. SHEPSTON.